United States Patent [19]

Faulkner

[11] 4,365,673

[45] Dec. 28, 1982

[54] TILLER HEAD WITH SHIFTABLE BLADES

[76] Inventor: Arnold T. Faulkner, R.R. #2, Box 443, Berrien Springs, Mich. 49103

[21] Appl. No.: 300,892

[22] Filed: Sep. 10, 1981

[51] Int. Cl.³ ................... A01B 33/02; A01B 33/14
[52] U.S. Cl. .................................... 172/95; 172/97
[58] Field of Search ............................ 172/91–96, 172/42, 43, 123, 125, 545, 546

[56] References Cited

U.S. PATENT DOCUMENTS

| | | | |
|---|---|---|---|
| 2,679,794 | 6/1954 | Ober | 172/42 |
| 2,882,977 | 4/1959 | Smith et al. | 172/42 X |
| 3,246,704 | 4/1966 | Honda et al. | 172/96 |
| 3,352,367 | 11/1967 | Honda et al. | 172/96 |

FOREIGN PATENT DOCUMENTS 419143 11/1934 United Kingdom ............... 172/94

Primary Examiner—Paul E. Shapiro
Attorney, Agent, or Firm—Oltsch, Knoblock & Hall

[57] ABSTRACT

A tiller head for a soil tilling device including a shaft which carries a number of blades which rotate with the shaft, and a drive for causing rotation of the shaft. A housing surrounds the drive. At least one of the blades is mounted for oscillatory movement where its ends shift laterally relative to the shaft. A camming device is carried by the housing and protrudes into the plane of rotation of the blade. The blade contacts the cam upon rotation of the shaft to urge the ends of the blade sequentially under the housing, thus tilling the soil under the housing.

4 Claims, 8 Drawing Figures

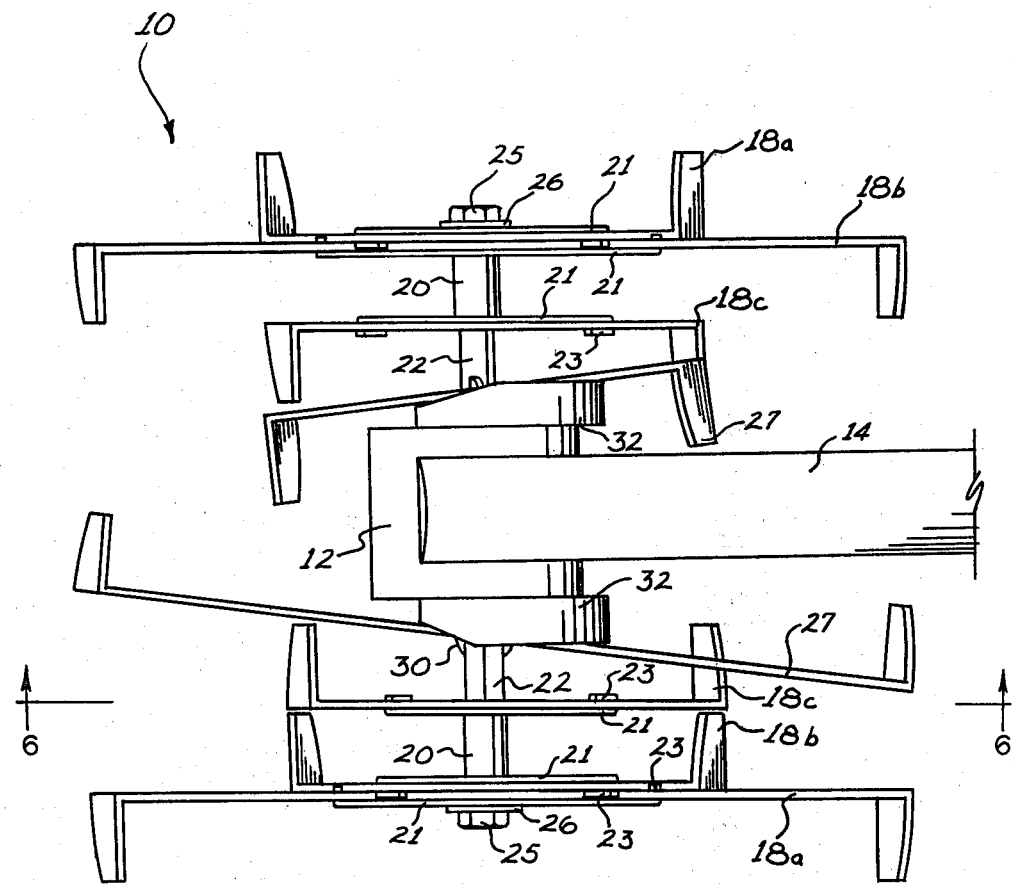
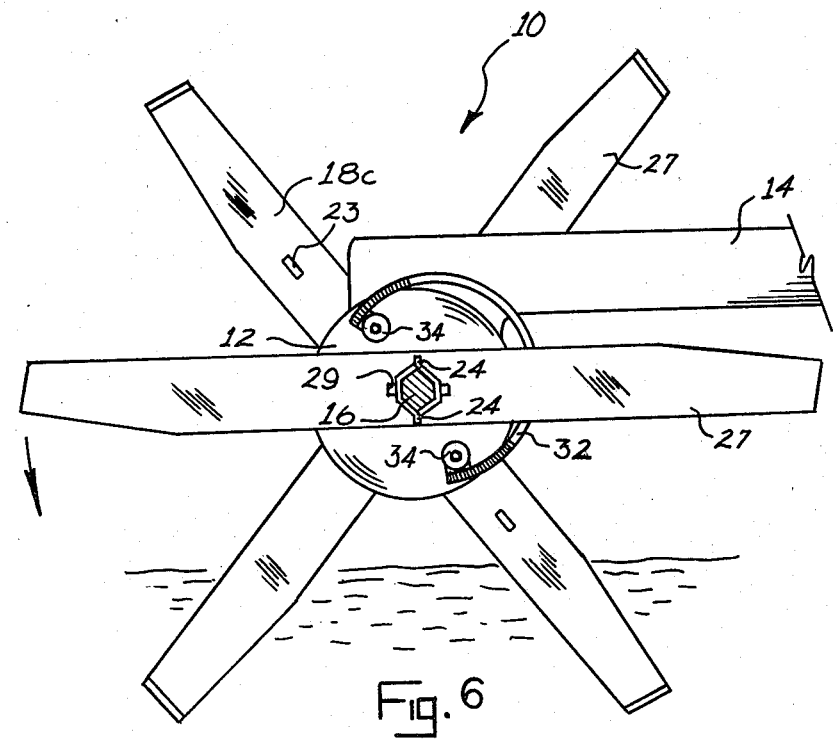

TILLER HEAD WITH SHIFTABLE BLADES

SUMMARY OF THE INVENTION

This invention relates to a tiller head for a soil tilling device.

Many soil tilling devices are constructed such that the drive for the rotatable blades is located between sets of blades and enclosed by a housing. Such a construction prevents tillage of the soil along the complete width of the tiller due to the inability to mount a blade in line with the drive housing.

Accordingly, it is an object of this invention to provide a tiller head having one or more shiftable blades for tilling soil beneath the drive housing.

Another object of this invention is to provide a tiller head which includes a blade mounted for oscillatory movement wherein the ends of the blade shift laterally upon blade rotation.

Other objects of this invention will become apparent upon a reading of the following description.

BRIEF DESCRIPTION OF THE DRAWINGS

FIG. 5 is a top plan view of the tiller head showing the blades rotated 60° from their positions in FIG. 3.

FIG. 6 is a side view of the tiller head taken along line 6—6 of FIG. 5.

DESCRIPTION OF THE PREFERRED EMBODIMENT

Figure 1:
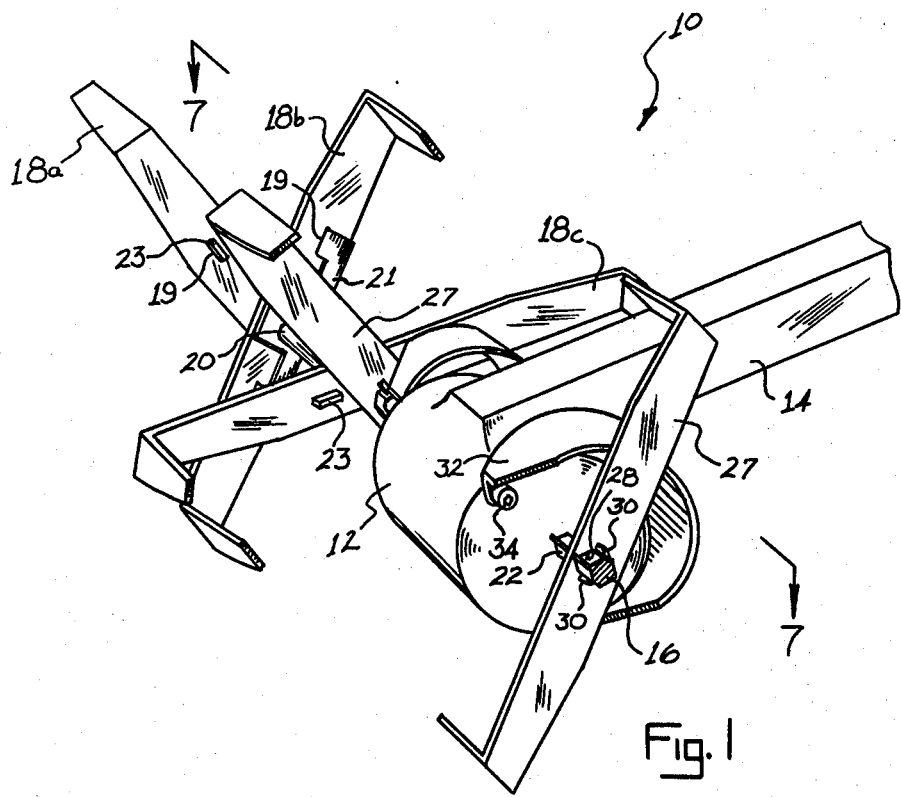
FIG. 1 is a perspective view of the tiller head with portions of the shaft cut away.

The preferred embodiment illustrated is not intended to be exhaustive or to limit the invention to the precise form disclosed. It is chosen and described in order to explain the principles of the invention and its application and practical use to thereby enable others skilled in the art to utilize the invention.

The tiller head 10 of this application includes a bearing support housing 12 in communication with a drive housing 14. A drive shaft (not shown) is contained within drive housing 14 and is in gear connection within housing 12 with the blade shaft 16. The drive shaft is connected to a power source at its other end. Blade shaft 16 extends from both sides of housing 12 and has a hexagonal or other polygonally shaped cross section. Tilling blades 18a–c are carried by shaft 16 at each side of support housing 12 in an angularly staggered relationship where each blade is 60° out of phase with the adjacent blades. Blades 18a–c each have a central opening which is shaped to fit complementally over the polygonal shaft 16 in a rotatively locked manner.

Each blade 18a–c has a slot 19 formed in it on each side of shaft 16. A reinforcing plate 21 having tabs 23 is fitted over shaft 16 and positioned against each blade 18a–c with its tabs 23 projecting through slots 19 in the blade. Blade 18c is spaced from blade 18b by a spacer 20 and from housing 12 by a spacer 22. Blades 18a and 18b contact each other. The blades are retained upon shaft 16 by a washer 26 and a nut 25 threaded onto the end of the shaft. The number, form and construction of such fixed blades can vary from tiller to tiller.

Figure 2:
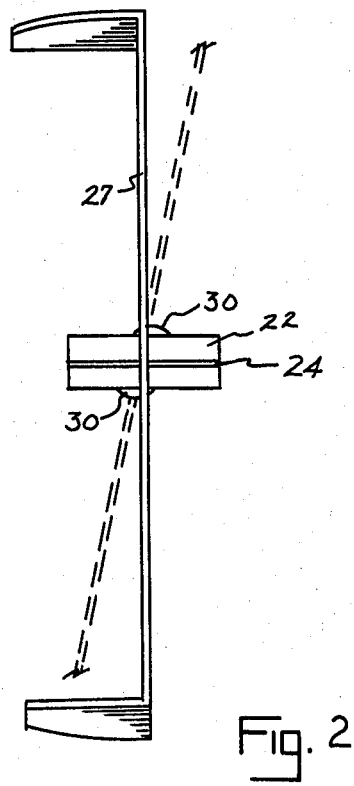
FIG. 2 is an elevational view of a shiftable blade illustrating its oscillatory position in broken lines.

An oscillatory blade 27 is carried by shaft 16 on each side of housing 12. Each spacer 22 conforms to the polygonal shape of shaft 16 so as to be rotatable with the shaft and includes oppositely extending drive tabs 30. Each blade 27 has a central irregular opening 28 and is fitted upon a spacer 22 with its irregular opening conforming to the outer shape of the spacer so as to be rotatable with the spacer and shaft 16. Blade opening 28 has slots 29 which accommodate drive tabs 30. Each spacer 22 also includes exterior ribs 24 between which blade 27 is located. Ribs 24, which are located approximately 90° from tabs 30, serve to prevent lateral movement of blade 27 along its spacer 22 but allow wobbling or oscillatory movement of the blade in a general plane extending longitudinally through shaft 16 as seen in broken lines in FIG. 2. Drive tabs 30 of each spacer 22 accommodate such oscillatory movement of its supported blade 27 and serve to provide extra driving engagement between the blade and spacer. For ease of assembly, each spacer 22 is preferably of a two piece construction.

Figure 3:
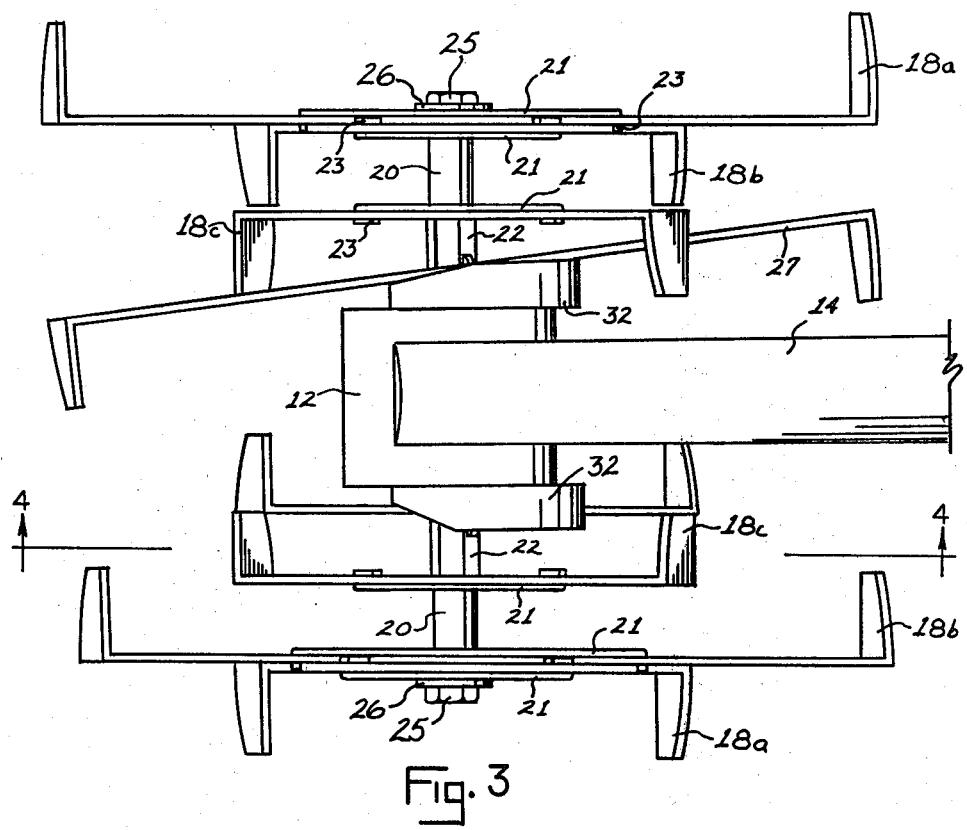
FIG. 3 is a top plan view of the tiller head.
Figure 4:
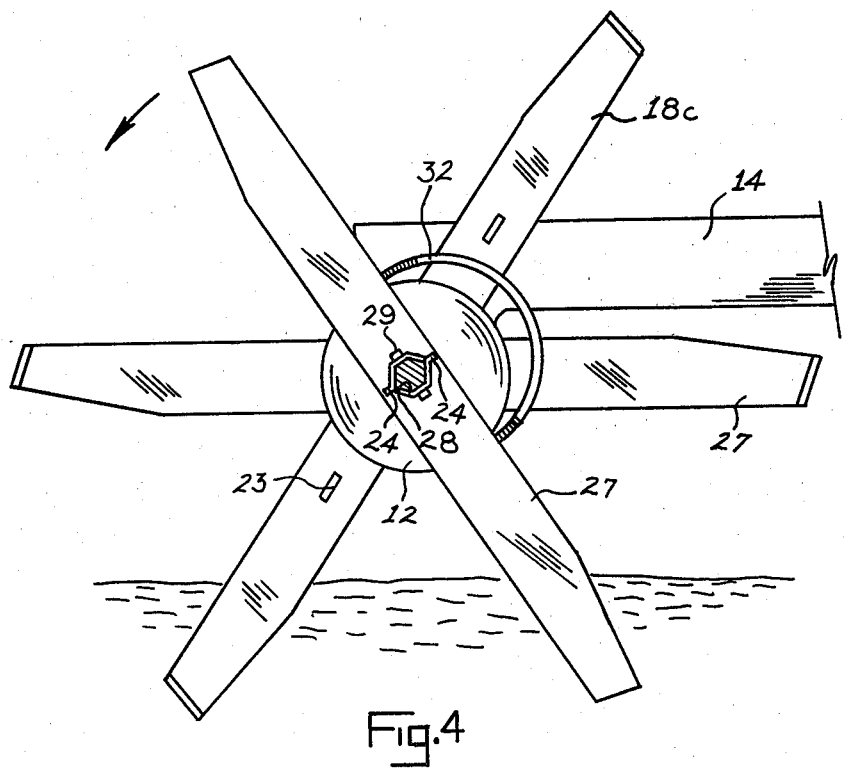
FIG. 4 is a side view of the tiller head taken along line 4—4 of FIG. 3.
Figure 7:
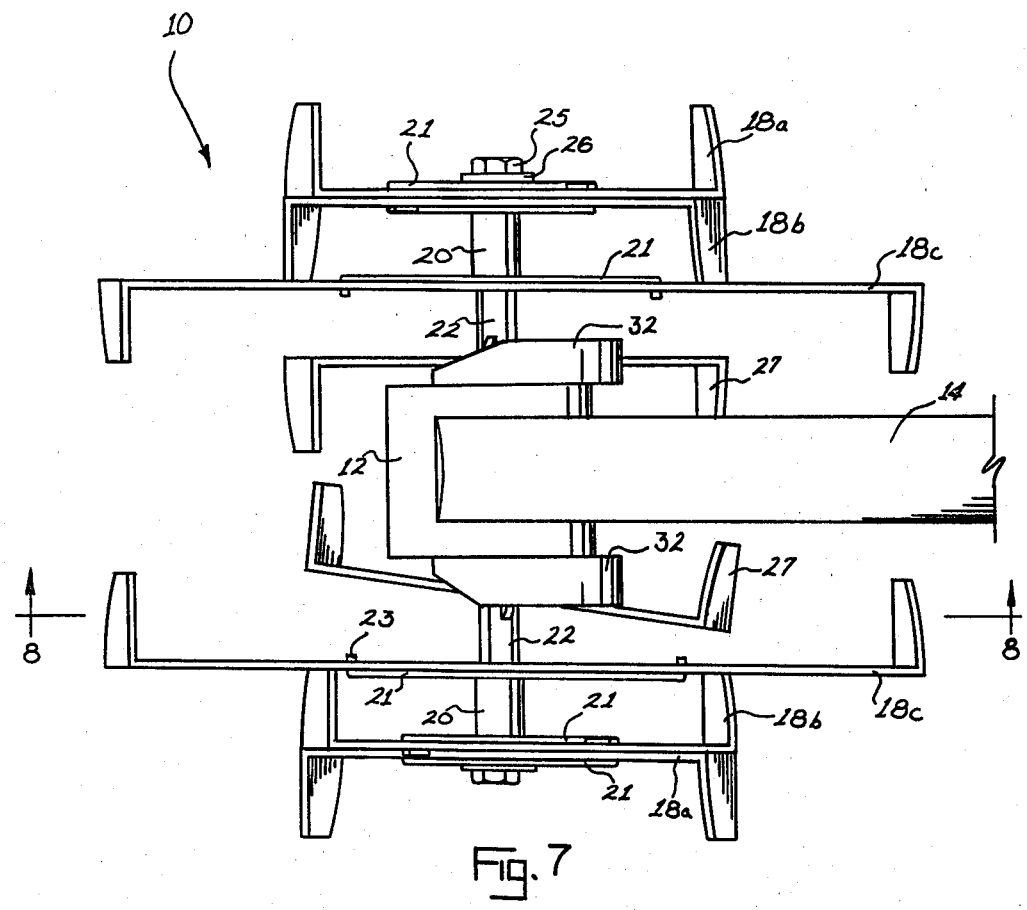
FIG. 7 is a top plan view of the tiller head showing the blades rotated 120° from their positions in FIG. 3.
Figure 8:
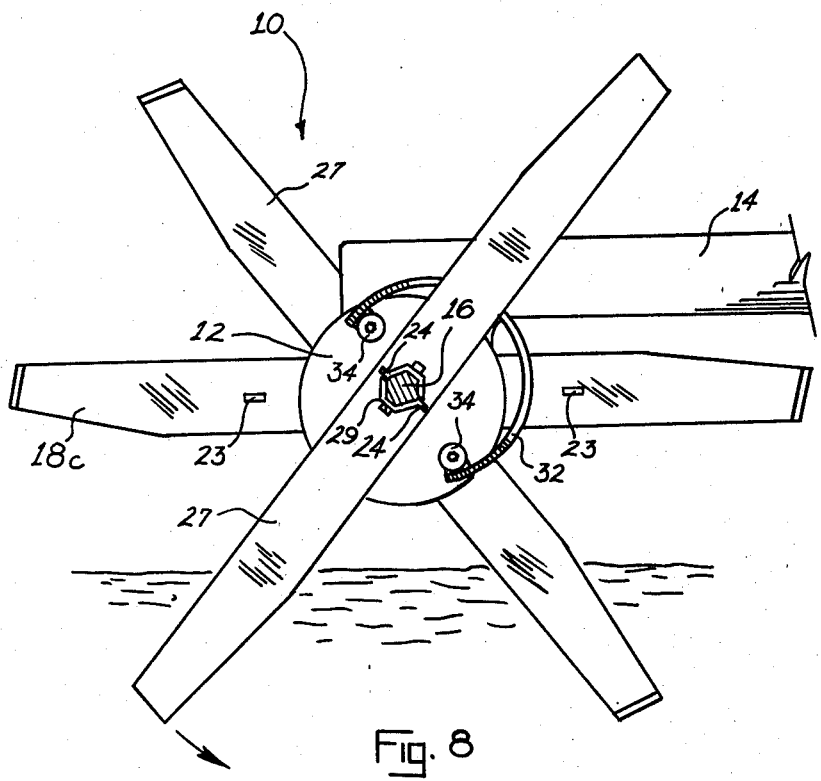
FIG. 8 is a side view of the tiller head taken along line 8—8 of FIG. 7.

A cam 32 is attached to each side of housing 12 with bolts 34 next to a blade 27. During rotation of blade shaft 16, each blade 27 bears against its adjacent cam 32 which is positioned to urge the upwardly traveling end of the blade outwardly away from housing 12 and consequently urge the downwardly traveling end of the blade inwardly and underneath housing 12, as shown sequentially in FIGS. 3, 5 and 7, so that the soil under the housing may be tilled. Blades 27 are positioned to rotate out of phase with each other.

It is to be understood that the invention is not to be limited to the above description but may be modified within the scope of the appended claims.

What I claim is:

1. In a tiller head including a housing, a rotatable shaft journalled in said housing, a plurality of blades mounted on said shaft and rotating with the shaft, the improvement comprising means mounting one of said blades on said shaft for oscillating movement wherein the ends of the blade shift laterally relative to the shaft, cam means for urging said one blade into said oscillatory movement during shaft rotation, said mounting means including a sleeve fitted over said shaft in a rotative relationship with the shaft, said sleeve having opposite drive tabs extending radially from said shaft, said one blade having a central opening therein, said opening accommodating said shaft and said sleeve and having slots in its periphery receiving said sleeve drive tabs to lock said one blade for rotation with the shaft, said sleeve including retaining means for preventing longitudinal movement of said blade along said sleeve at said blade opening while permitting said oscillatory movement of said blade ends.

2. In a tiller head including a housing, a rotatable shaft journaled in said housing, a plurality of blades mounted on said shaft and rotating with the shaft, the improvement comprising means mounting one of said blades on said shaft for oscillating movement wherein the ends of the blade shift laterally relative to the shaft, and cam means urging said one blade into said oscillatory movement during shaft rotation, said cam means carried by said housing and protruding into the plane of rotation of said one blade, said one blade contacting said cam means upon shaft rotation to urge said blade ends sequentially under the housing for tilling the soil under the housing.

3. The tiller head of claim 2 wherein said tiller head includes additional means mounting another of said blades on said shaft for oscillating movement wherein the ends of the other blade shift laterally relative to the shaft, said other blade angularly displaced upon said shaft from said one blade, and second cam means for urging said other blade into its said oscillatory movement, said second cam means carried by said housing and protruding into the plane of rotation of said other blade, said other blade contacting said second cam means upon shaft rotation to urge said other blade ends sequentially under the housing for tilling the soil under the housing.

4. In a tiller head including a housing, a rotatable shaft journaled in said housing and extending from opposite sides of the housing, a plurality of blades mounted on said shaft at each side of said housing and rotating with the shaft, the improvement comprising means mounting a first of said blades adjacent one side of said housing and a second of said blades adjacent the other side of said housing for oscillatory movement wherein the ends of the blades shift laterally relative to said shaft under said housing, first cam means for urging said first blade into said oscillatory movement during shaft rotation, said first cam means carried by said housing and protruding into the plane of rotation of said first blade, said first blade contacting said cam means upon shaft rotation to urge said blade ends sequentially under the said housing, said first blade being angularly displaced upon said shaft from said second blade, second cam means carried by said housing and protruding into the plane of rotation of said second blade, said second blade contacting said second cam means upon shaft rotation to urge said second blade ends sequentially under the housing.

* * * * *